United States Patent [19]

Needham

[11] Patent Number: 5,167,021
[45] Date of Patent: Nov. 24, 1992

[54] MULTIMEDIA INTERFACE DEVICE AND METHOD

[75] Inventor: David B. Needham, Kissimmee, Fla.

[73] Assignee: NCR Corporation, Dayton, Ohio

[21] Appl. No.: 246,249

[22] Filed: Sep. 19, 1988

[51] Int. Cl.⁵ .......................................... G06F 15/20
[52] U.S. Cl. .......................... 395/275; 364/DIG. 2; 395/800; 395/500
[58] Field of Search ... 364/200 MS File, 900 MS File

[56] References Cited

U.S. PATENT DOCUMENTS

| Re. 31,692 | 10/1984 | Tyburski et al. | 382/7 |
| 3,876,981 | 4/1975 | Welch | 340/146.3 D |
| 4,029,944 | 6/1977 | Trenkamp | 235/61.11 D |
| 4,041,279 | 8/1977 | Foote | 235/61.7 B |
| 4,056,712 | 11/1977 | Trenkamp | 235/440 |
| 4,180,207 | 12/1979 | Lee | 235/493 |
| 4,266,281 | 5/1981 | Struger et al. | 364/900 |
| 4,322,794 | 3/1982 | Kurakake | 364/200 |
| 4,371,925 | 2/1983 | Carberry et al. | 364/200 |
| 4,396,995 | 8/1983 | Grau | 364/900 |
| 4,434,460 | 2/1984 | Drakenborn et al. | 364/200 |
| 4,442,504 | 4/1984 | Dummermuth et al. | 364/900 |
| 4,809,217 | 2/1989 | Floro et al. | 364/900 |
| 4,821,179 | 4/1989 | Jensen et al. | 364/200 |

Primary Examiner—Joseph L. Dixon
Attorney, Agent, or Firm—James M. Stover

[57] ABSTRACT

An interface device between, and a method for providing data from, one of a plurality of optical or magnetic media reader devices to a host is disclosed. The interface device comprises first and second input ports, each port being connectable to a selected media device. The device also comprises means for automatically identifying the type of media device connected to each of the ports by sequentially sampling control or data signals therefrom. It also includes means for determining when an identified media device is active by sampling control or data signals from each port that has an identified media device connected thereto.

6 Claims, 5 Drawing Sheets ered to as electronic character recognition. Numerous media reader devices now exist for sensing or reading coded information and transmitting the information to a computer. Such reader devices may be broadly categorized by the type of media storing the data, i.e., either optical or magnetic. Common optical readers include bar code wands, bar code slot readers, laser scanners, and CCD scanners. A common magnetic reader is a magnetic slot reader.

MULTIMEDIA INTERFACE DEVICE AND METHOD

The present invention relates to an apparatus and method for providing data from an optical or magnetic media reader device to a host. More particularly, the invention relates to the identification of an unknown media device and the determination of when such media device is active.

BACKGROUND OF THE INVENTION

An increasingly common application for computer technology is the decoding of information placed on various media. For example, bar codes are used extensively in the retail industry as are magnetic codes in the financial industry. The process by which such information is "read" by a computer and decoded is generically referred to as electronic character recognition. Numerous media reader devices now exist for sensing or reading coded information and transmitting the information to a computer. Such reader devices may be broadly categorized by the type of media storing the data, i.e., either optical or magnetic. Common optical readers include bar code wands, bar code slot readers, laser scanners, and CCD scanners. A common magnetic reader is a magnetic slot reader.

Prior art systems for reading coded data typically have one of the above media devices connected to a dedicated line for receiving data from such device. If more than one type of media device is to be utilized, separate input lines and typically separate computers for receiving the data signals are required.

OBJECTS OF THE INVENTION

It is therefor an object of the present invention to provide an interface device between a host and a selected one of a plurality of different optical or magnetic media reader devices.

It is another object of the present invention to provide a method for identifying an unknown media device and determining when such device is active.

SUMMARY OF THE INVENTION

In one form, the present invention is an interface device between one of a plurality of optical or magnetic media reader devices and a host. The interface device comprises first and second input ports, each port being connectable to a selected media device. The interface device also comprises means for automatically identifying the type of media device connected to each of the ports by sequentially sampling control or data signals therefrom. It also includes means for determining when an identified media device is active by sampling control or data signals from each port that has an identified media device connected thereto.

In another form, the present invention is a method for providing data from one of a plurality of optical or magnetic media reader devices to a host. An interface device with first and second input ports is provided between the media devices and the computer. One or two of the media devices are selected and connected to one or both of the input ports, respectively. The type of media device connected to each of the ports is identified by sequentially sampling control or data signals from each port. An identified media device is determined to be active by sampling control or data signals from each port that has an identified media device connected thereto. Data signals from the active media device are then transferred into the interface device where they are processed before being transferred to the host.

DETAIL DESCRIPTION OF THE INVENTION

Figure 1:
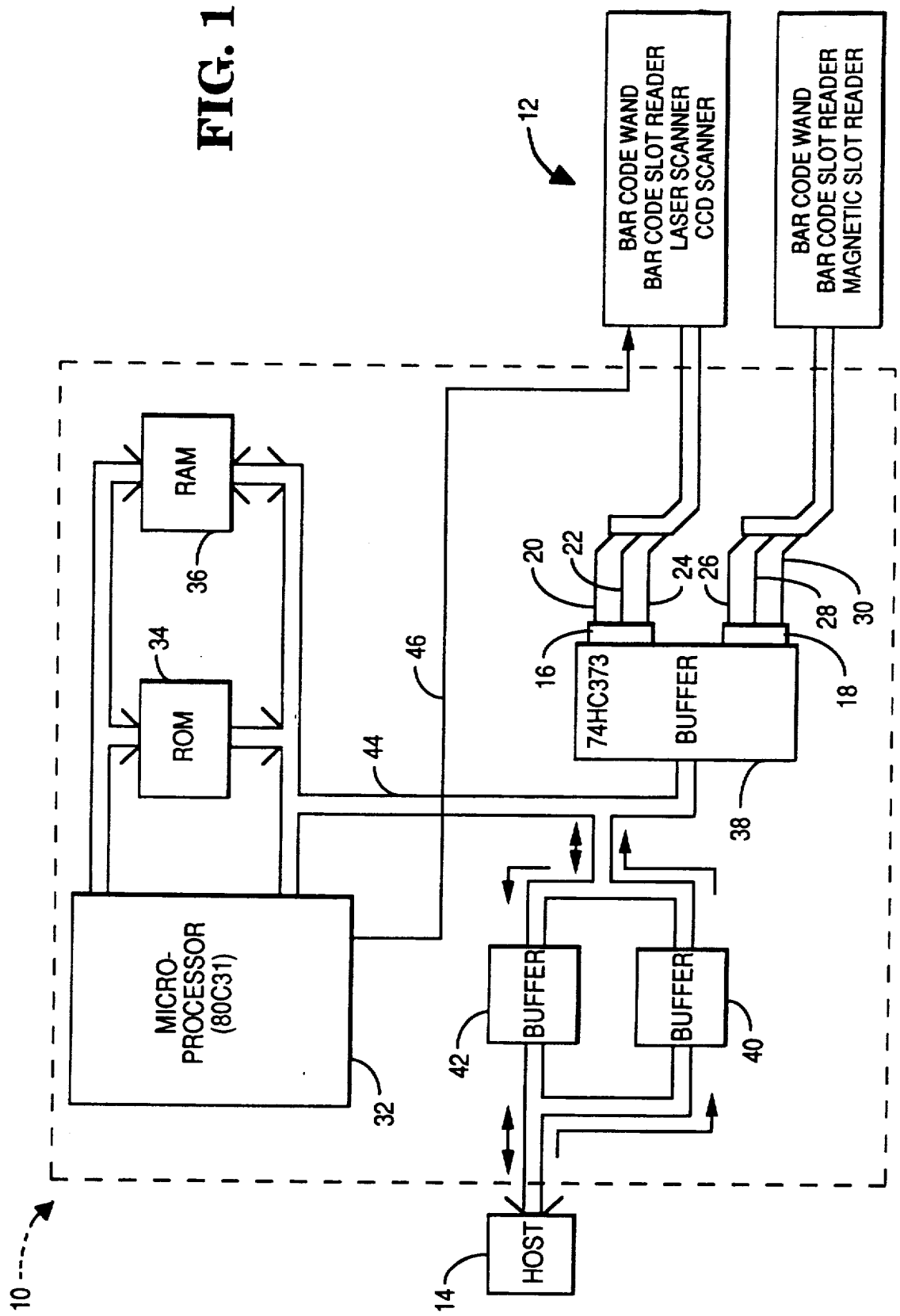
FIG. 1 is a schematic block diagram of a multimedia interface device according to one form of the present invention.

FIG. 1 shows a schematic diagram of an interface device 10 between one of a plurality of optical or magnetic media reader devices 12 and a host 14 such as a host computer. The media devices include a bar code wand, bar code slot reader, laser scanner, CCD scanner and magnetic slot reader. Interface device 10 has two input ports 16 and 18, each of which is connectable to one of the media devices 12. In a preferred embodiment input port 16 is connectable to the bar code wand, bar code slot reader, laser scanner or CCD scanner, and input port 18 is connectable to the bar code wand, bar code slot reader or magnetic slot reader. Each input port 16 and 18 has three input lines labeled 20, 22 and 24, and 26, 28 and 30, respectively. Lines 20 and 26 provide data from media devices 12 to input ports 16 and 18, respectively. Lines 22 and 24 and lines 28 and 30 provide respective control signals as will be discussed further on.

Interface device 10 includes a microprocessor 32 which in a preferred embodiment is an 80C31 microprocessor. A ROM 34 is used for storing a microprogram such as may be constructed from flowcharts described in FIGS. 2A, 2B, 3A and 3B. A RAM 36 will be used for temporary storage of data received through input ports 16 and 18 and is used in a conventional manner in conjunction with microprocessor 32. Interface device 10 also includes media port buffer 38 for receiving control and data signals from input ports 16 and 18. A feature of the present invention is that all of the necessary signals can be stored within a single eight (8) bit buffer. In a preferred embodiment, buffer 38 is a 74HC373 buffer chip. Two additional buffers, input buffer 40 and output buffer 42, connect interface device 10 with host 14. A data bus 44 connects media port buffer 38 to microprocessor 32, ROM 34, RAM 36 and input/output buffers 40 and 42. A line 46 is also provided for transmitting an enable signal from microprocessor 32 to one of the media devices 12 connected to first port 16.

In operation, a selected media reader device 12 may be connected to port 16 or 18, or two devices 12 may be selected and connected to respective ones of ports 16 and 18. As noted previously, a bar code wand and bar code slot reader may be connected to either port 16 or 18. However, in a preferred embodiment the laser scanner and CCD scanner may be connected only to port 16, and the magnetic slot reader may only be connected to port 18. Normally, a user will connect only one media device 12 at a time. However, the present invention is operable even if two such devices 12 are connected to ports 16 and 18, respectively. When devices 12 are connected to both ports, interface device 10 receives data from only one such device at a time and ignores any data transmitted by the other.

Interface device 10 performs a number of functions with respect to the media devices 12 and the data generated therefrom. First, interface device 10 identifies the type of media device connected to each of ports 16 and 18 by sequentially sampling control or data signals appearing on the various lines 20, 22, 24, 26, 28 and 30. Next, interface device 10 determines when an identified media device 12 is active by sampling control or data signals from each port that has an identified media device connected thereto. Next, interface device 10 transfers data signals from an active media device 12 into interface device 10 for processing. Finally, processed signals are transferred to host 14 according to a predetermined protocol.

Figure 2A:
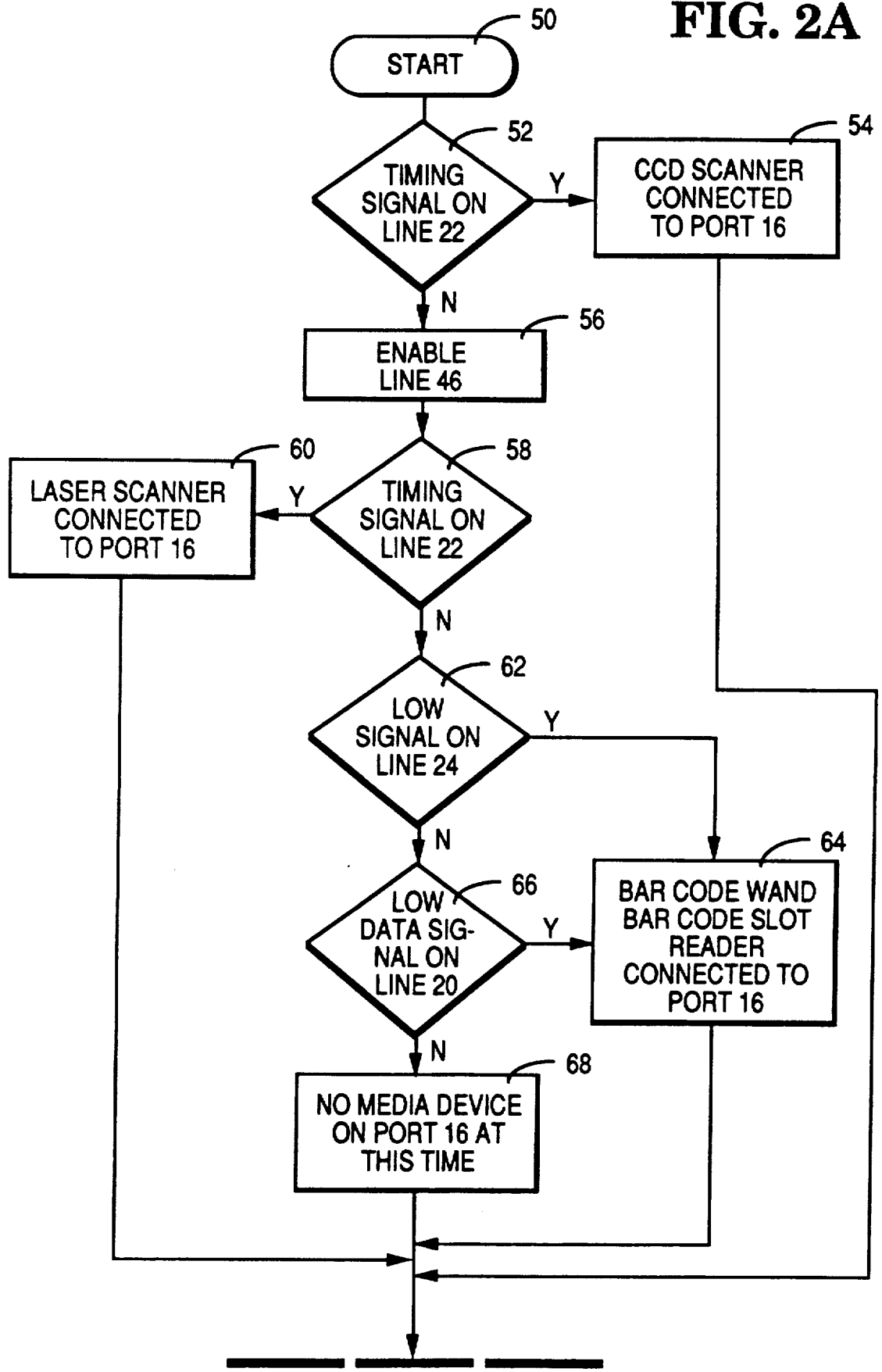
FIGS. 2A and 2B comprise a flow chart describing the methodology of identifying the type of media device connected to an input port.
Figure 2B:
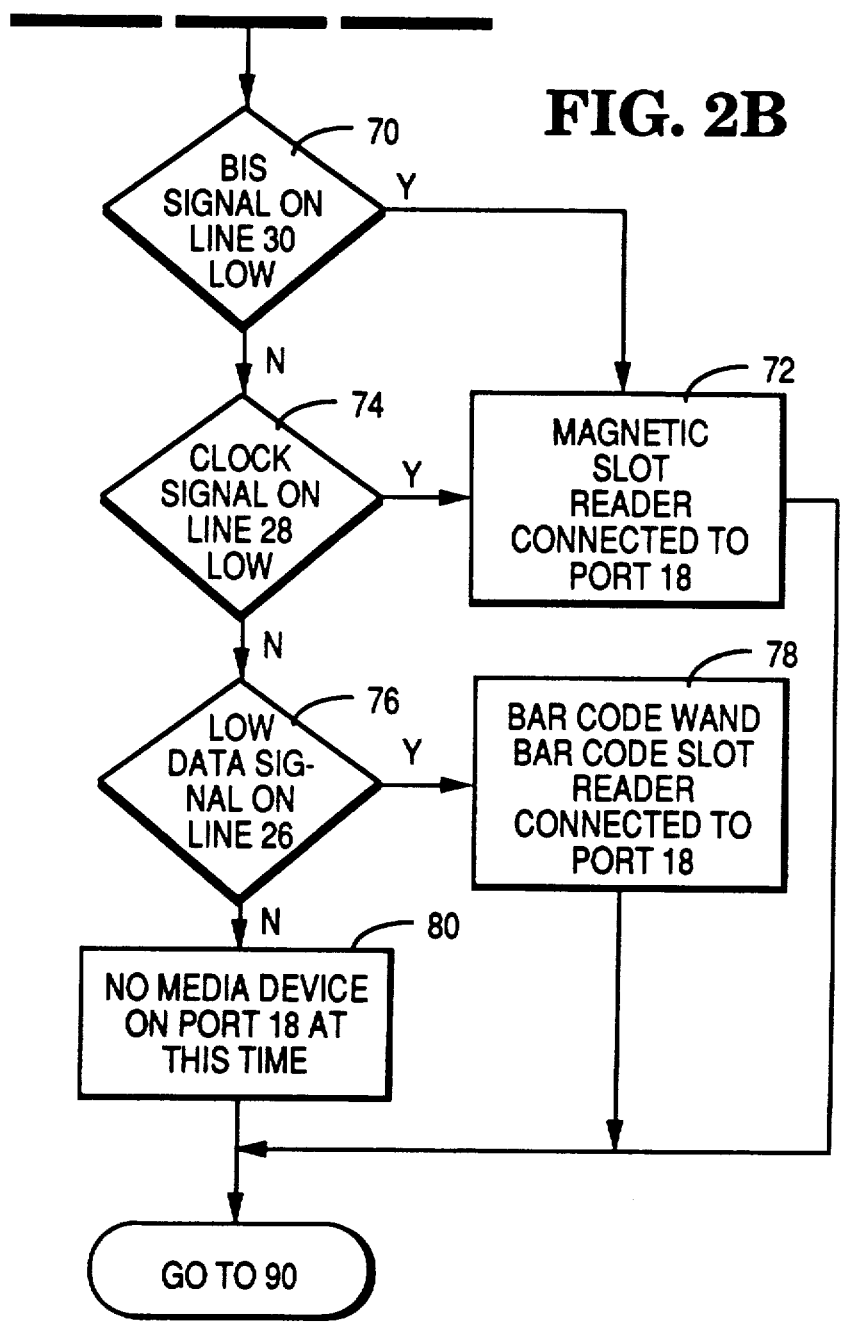

Referring now to FIGS. 2A and 2B, a flowchart is shown which describes how the type of media device 12 which may be connected to port 16 and/or 18 is identified. The process is started automatically, as shown by block 50, when the media interface device is first powered up or is reset.

In block 52, line 22 is sampled for the presence of a signal. As noted previously, lines 20 and 26 are dedicated to receiving data signals from respective port 16 and 18 media devices. In a preferred embodiment, the control signals are allocated as follows: line 22 receives a timing signal, line 24 receives a trigger signal, line 28 receives a clock signal and line 30 receives a badge-in-slot signal. Thus, when line 22 is sampled, the presence of a timing signal identifies the device 12 which is connected to port 16. More specifically it identifies a CCD scanner which, of the four devices 12 connectable to port 16 (bar code wand, bar code slot reader, laser scanner and CCD scanner), is the only one which continuously transmits a timing signal. Thus, the presence of a signal on line 22 indicates that a CCD scanner is connected to port 16 as noted in block 54.

If no signal is received on line 22, it is concluded that no CCD device is connected to port 16 at this time. As shown in block 56, an enable signal is transmitted over line 46 and line 22 is again sampled to determine the presence of a timing signal (block 58) in response to the enable signal. Of the four devices connectable to port 16, the enable signal only activates the laser scanner or CCD scanner, and, of the two, only the laser scanner transmits a timing signal and only when an enable signal is received. Thus, the presence of a timing signal on line 22 in block 58 indicates that a laser scanner is connected to port 16 as noted in block 60.

All that remains to be checked on port 16 is the presence of a bar code wand or bar code slot reader. Since a bar code wand and bar code slot reader have the same connection and transmit the same type of signal, it is not necessary to distinguish between the two. There are at least two different connections for bar code wands and slot readers, either one or both of which may be employed. In one configuration, the electrical shield on the wand/slot reader may be grounded through line 24. In another configuration, the wand/slot reader has an active low data line 20. If no signal is received on line 22 in block 58, the trigger signal on line 24 is sampled (block 62) for the presence of a signal. In a preferred embodiment all of the input lines to ports 16 and 18 are precharged high. Thus, if a low signal is present on line 24, either a bar code wand or bar code slot reader with a shielded ground is connected to port 16, as indicated in block 64. If a low signal is not present on line 24, the data signal on line 20 is sampled, as indicated in block 66. If the data signal is low, the presence of either a bar code wand or bar code slot reader is indicated. If the data signal is not low, no media device is connected to port 16 at this time (block 68).

In order to avoid ambiguity in results, it is preferred to sequence blocks 52, 56 and 58 in the order described. For example, if line 46 were enabled before first checking for a timing signal on line 22, the presence of a timing signal on line 22 could indicate either a CCD scanner or a laser scanner. Otherwise, the sequence of executing the previously described steps may be varied without departing from the present invention.

Port 18, as noted previously, will support a bar code wand, bar code slot reader or magnetic slot reader in a preferred embodiment. The three input lines to port 18 are connected to receive the following signals: line 26 receives a data signal, line 28 receives a clock signal, and line 30 receives a badge-in-slot signal. In a preferred embodiment, lines 26, 28 and 30 are precharged to a high state.

If a media device is identified as being connected to port 16 as shown in blocks 54, 60 or 64, or if no media device 12 is connected as indicated in block 68, port 18 is next checked for the presence of a media device. Block 70 indicates the sampling of the badge-in-slot (BIS) line 30 wherein the presence of an active low signal indicates that a magnetic slot reader is connected to port 18 (block 72). If the badge-in-slot line 30 is high but the clock line is low when sampled (block 74), this also indicates the presence of a magnetic slot reader (block 72). It will be understood that when the clock line is inactive it will normally be maintained at an inactive high level by pull up resistors within port 16. When it becomes active it provides a pulse train of high/low pulses. Thus, what is meant by a "low" clock line is activity on the line represented by a transition from high to low. If the clock line 28 is high, the data signal on line 26 is sampled (block 76). As with data line 20 for port 16, a low data signal on line 26 indicates the presence of a bar code wand or bar code slot reader on port 18 (block 78). If the data signal on line 26 is high, no media device is connected to port 18 at this time (block 80). According to a preferred embodiment of the present invention, media devices may only be connected to ports 16 and 18 when interface device 10 is shut off. Thus, the steps shown in the flowchart of FIGS. 2A and 2B will only be sequenced once during power up or reset of interface device 10. The sequence of executing steps 70, 74 and 76 may be varied without departing from the present invention.

Figure 3A:
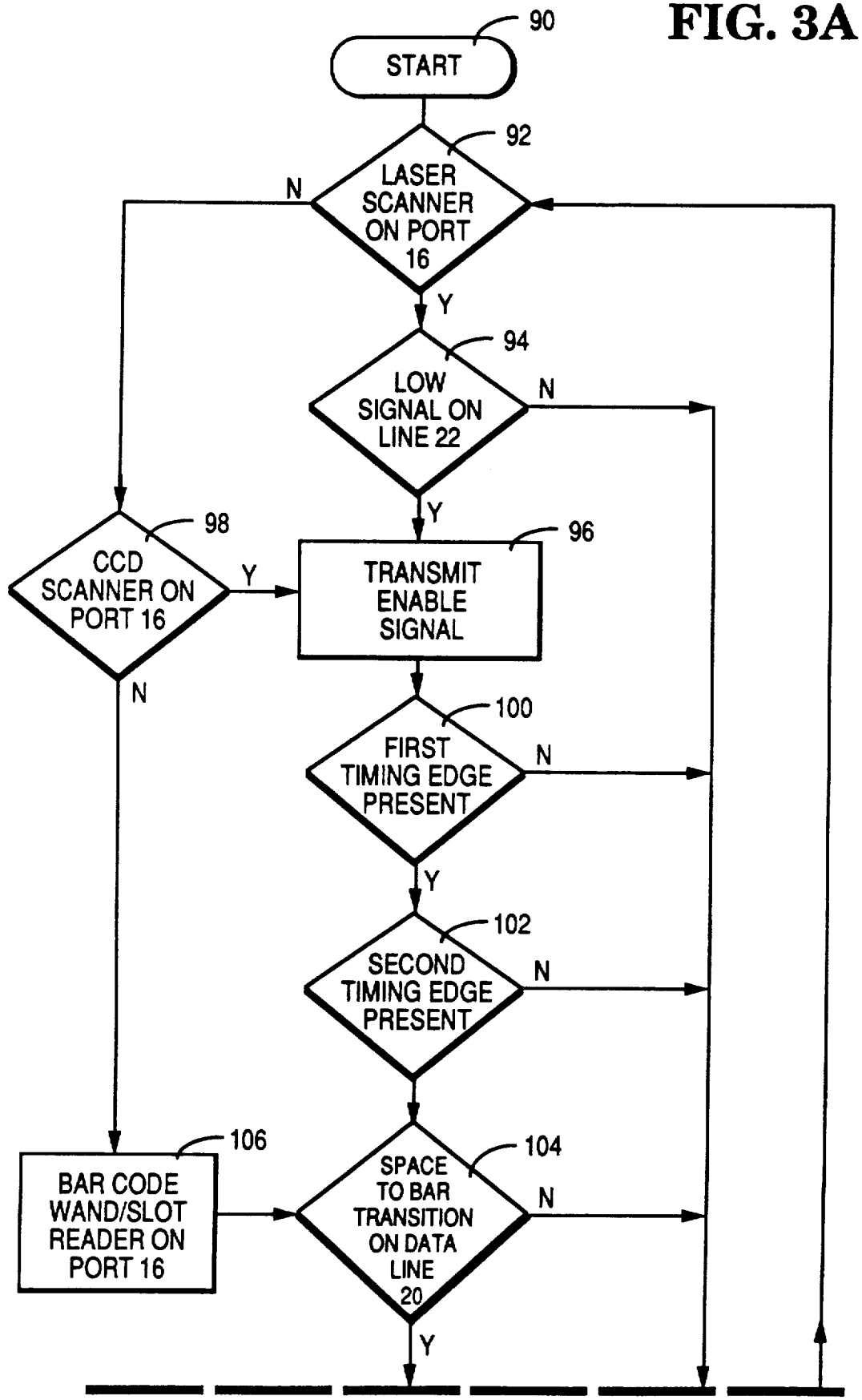
FIGS. 3A and 3B comprise a flow chart describing the methodology of determining when an identified media device is active.
Figure 3B:
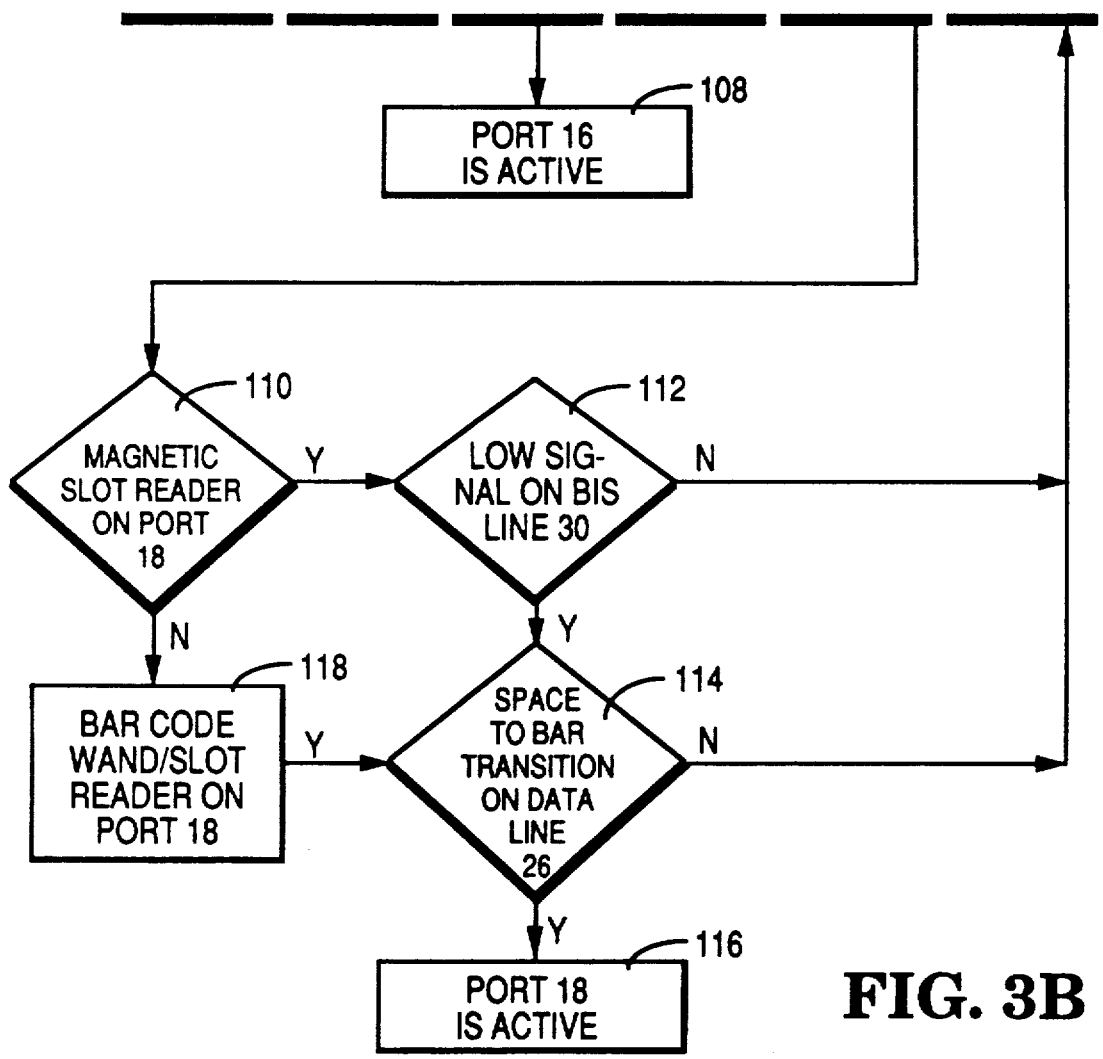

Once a media device 12 has been identified as being connected to a given port, as described above with reference to FIGS. 2A and 2B, it is next determined when such media device 12 is active. Referring now to FIGS. 3A and 3B, a flowchart is shown which describes the determination of when an identified media device is active. This determination starts (block 90) after media devices connected to ports 16 and/or 18 have been identified. Even if no device has been identified the determination will be attempted in the event that a device was missed during the identification step or if a device was connected to port 16 or 18 after power up.

Block 92 is the branch point depending upon whether a laser scanner has been identified as being connected to port 16. If a laser scanner is present, the trigger signal on line 22 is monitored to detect activity (block 94). To repeat, the control and data lines 20, 22, 24, 26, 28 and 30 are precharged high in a preferred embodiment so trigger activity on line 24 will be detected by the presence of a low signal. A low signal on line 22 indicates that an operator has pressed the trigger on the laser scanner and may be ready to read media. If line 22 is inactive (high), activity on port 18 is determined, as will be discussed further on.

In the event that the trigger of the laser scanner has been pressed, an enable signal is transmitted from interface device 10 over line 46 (block 96). It should be noted that the transmission of the enable signal is a common operation for both a laser scanner and a CCD scanner. In other words, the steps for determining port 16 activity is the same for both the laser and CCD scanners from the step of transmitting an enable signal over line 46. See blocks 94, 98 and 96.

Once an enable signal is transmitted the timing signal is monitored (blocks 100 and 102). Data from a CCD scanner is only transmitted on every second timing edge as opposed to a data from a laser which is transmitted after every timing edge. Thus, for CCD data two timing edges need to be detected before data can be expected. In the event that either one of the timing edges is not detected, activity on port 18 is determined, as will be discussed further on.

In the event that a second timing edge is detected (block 102), the data signal on line 20 is monitored for a signal indicative of media device activity. In a preferred embodiment data line 20 is precharged high, and since the first signal expected from a bar code reader is a space which may be transmitted as a low signal, activity on port 16 will be indicated by the presence of a space (low signal) on line 20 followed by a bar (high signal) (block 104). It will be noted that the monitoring of data line 20 is an operation which a laser scanner, a CCD scanner, a bar code wand and a bar code slot reader have in common. (See blocks 102, 106 and 104). If a space (low signal) on data line 20 is detected at block 104 followed by a bar (high signal), port 16 is active (block 108). Once one port is determined to be active, data is received and processed by interface device 10, and the other port is ignored. It will be noted that activity on line 20 will be checked even if no media device was identified as being connected to port 16. This is done in case the identification was missed or the device was connected to port 16 after power up.

If any of the various signals described in blocks 94, 100, 102 or 104 are not present when monitored, activity by any media device 12 connected to port 18 will be determined. If a magnetic slot reader has been identified as being connected to port 18 (block 110), the badge-in-slot signal on line 30 is monitored for a signal indicating that media has been inserted into the slot of a magnetic slot reader. In a preferred embodiment, line 30 is precharged high so a low signal indicates that media has been inserted (112). Data line 26 is then monitored (block 114) for a predetermined signal in the same manner as described with respect to data line 20 (block 104). In a preferred embodiment, a high signal on data line 26 indicates that port 18 is inactive whereas a space (high signal) to bar (low signal) transition indicates that port 18 is active (block 116).

In the event that a bar code wand or bar code slot reader has been identified as being connected to port 18 (block 118), or if no device has been identified, data line 26 is monitored (block 114), as described above, for the presence of activity.

Should an activity not be detected on line 30 or line 26 (blocks 112, 114), the process returns to block 92. This process is repeated until activity on either port 16 (block 108) or port 18 (block 116) is confirmed. Data may now be transferred from the identified media device 12 to interface device 10 for processing. Since the type of media device 12 is known by the interface device 10, and since data is being transmitted by media device 12, interface device 10 may use any predetermined protocol for accepting and interpreting the data from the specific device 12. The signals may then be processed by interface device 10. In a preferred embodiment, the processing will include conversion to a standard format such as ASCII. In this form the data may then be transferred to host 14.

It will be clear to those skilled in the art that the present invention is not limited to the specific embodiment disclosed and illustrated herein. Numerous modifications, variations, and full and partial equivalents can be undertaken without departing from the invention as limited only be the spirit and scope of the appended claims.

What is desired to be secured by Letters Patent of the United States is as follows:

1. A method for providing data from one of a pluality of media reader devices, said plurality of media reader devices including a bar code wand, bar code slot reader, laser scanner, CCD scanner and magnetic slot reader, to a host comprising the steps of:

providing an interface device between said media devices and said host;

providing first and second input ports to said interface device, each input port having three input lines for receiving one data and two control signals, respectively, from a connected media device, wherein said laser scanner and CCD scanner are connectable only to said first control port, said control signals for said first port include signals for timing and a trigger, said magnetic slot reader is connectable only to said second port, and said control signals for said second port include signals for clock and badge-in-slot;

providing a line for an enable signal from said interface device to a media device connected to said first port, said enable signal being effective for activating either said laser scanner or CCD scanner;

selecting one or two of said media devices and connecting it or them to one or respective ones of said input ports;

identifying the type of media device connected to said first port by:
sampling said timing signal to determine if the media device is a CCD scanner;
transmitting said enable signal and sampling said timing signal to determine if the media device is a laser scanner; and
sampling said trigger signal or said data signal to determine if the media device is a bar code wand or bar code slot reader;

identifying the type of media device connected to said second port by:
sampling said clock or badge-in-slot signal to determine is the media device is a magnetic slot reader; and
sampling said data signal to determine if the media device is a bar code wand or bar code slot reader;

determining when an identified media device is active by sampling control or data signals from each port that has an identified media device connected thereto;

transferring data signals from said active media device into said interface device for processing; and transferring said processed signals to said host.

2. The method of claim 1 wherein if a laser scanner has been identified as being connected to said first port, said step of determining when said laser scanner is active includes:

monitoring said trigger signal;

transmitting said enable signal from said interface device to said laser scanner when said trigger signal is active;

monitoring said timing signal for a predetermined signal; and monitoring said data signal for a predetermined signal indicative of an active laser scanner.

3. The method of claim 1 wherein if a CCD scanner has been identified as being connected to said first port, said step of determining when said CCD scanner is active includes:

transmitting said enable signal from said interface device to said CCD scanner;

monitoring said timing signal for a predetermined signal; and monitoring said data signal for a predetermined signal indicative of an active laser scanner.

4. The method of claim 1 wherein if a bar code wand or bar code slot reader has been identified as being connected to said first port, said step of determining when said bar code wand or bar code slot reader is active includes:

monitoring said data signal for a predetermined signal indicative of an active bar code wand or bar code slot reader.

5. The method of claim 1 wherein if a magnetic slot reader has been identified as being connected to said second port, said step of determining when said magnetic slot reader is active includes:

monitoring said badge-in-slot signal for a predetermined signal; and monitoring said data signal for a predetermined signal indicative of an active magnetic slot reader.

6. The method of claim 1 wherein if a bar code wand or bar code slot reader has been identified as being connected to said second port, said step of determining when said bar code wand or bar code slot reader is active includes:

monitoring said data signal for a predetermined signal indicative of an active bar code wand or bar code slot reader.

* * * * *